(No Model.)

C. F. PIKE.
WATER CLOSET JOINT.

No. 302,583. Patented July 29, 1884.

Witnesses:
E. H. Bond.
Paul D. Sullivan.

Inventor:
C. F. Pike
per S. J. Van Stavoren
Atty.

UNITED STATES PATENT OFFICE.

CHARLES F. PIKE, OF PHILADELPHIA, PENNSYLVANIA, ASSIGNOR TO THE NATIONAL ANTI-SEWER GAS COMPANY, OF SAME PLACE.

WATER-CLOSET JOINT.

SPECIFICATION forming part of Letters Patent No. 302,583, dated July 29, 1884.

Application filed November 23, 1882. (No model.)

*To all whom it may concern:*

Be it known that I, CHARLES F. PIKE, a citizen of the United States, residing at Philadelphia, in the county of Philadelphia and State of Pennsylvania, have invented certain new and useful Improvements in Water-Closet Joints, of which the following is a specification, reference being had therein to the accompanying drawings, wherein—

Figure 1:
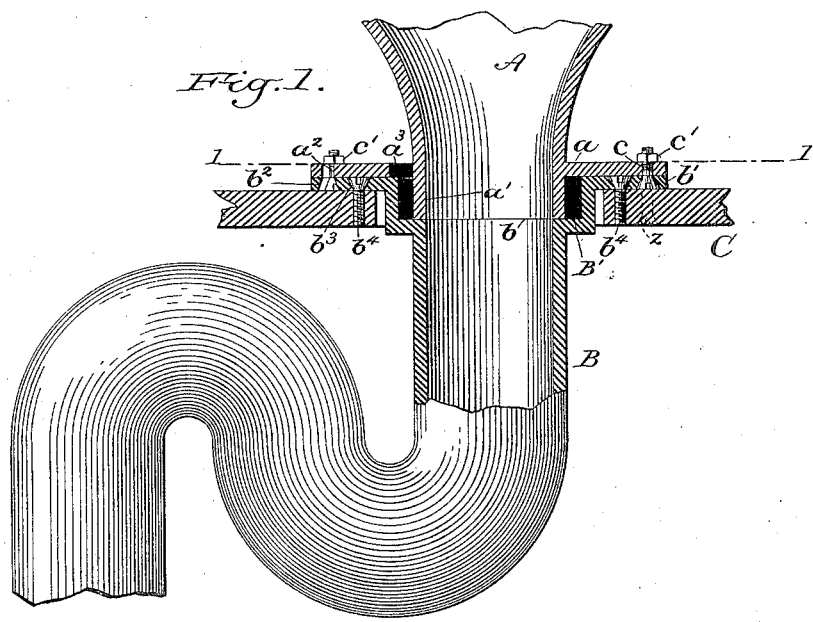
Figure 2:
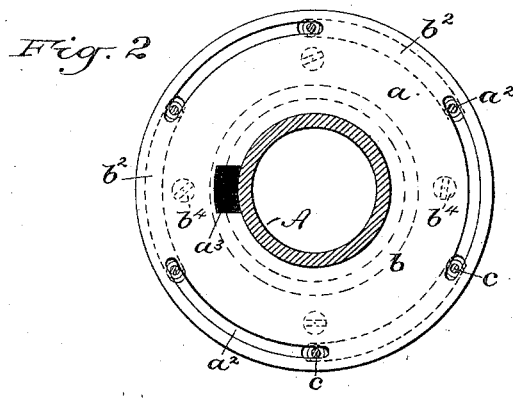

Figure 1 is a sectional elevation of a part of a water-closet hopper or retainer and trap. Fig. 2 is a section on line 1 1, Fig. 1.

My invention has relation to the joints for water-closets and traps. Heretofore in placing or setting up water-closets in buildings, &c., the retainer or hopper is screwed or otherwise fastened to the floor or other support, and connected to the trap by what is known as a "putty joint," with the lower end of the retainer or hopper resting within the bell-mouth end of the trap, the latter being supported in position by the soil-pipe, the sections of which are secured together by a lead joint. The objections to such construction and arrangement are as follows: As the putty dries, it shrinks away from the walls of the trap, thereby breaking or producing an imperfect joint between the trap and the retainer or hopper. Again, the trap being held in position by the soil-pipe, and not connected to the floor, as is the retainer or hopper, said trap offers no resistance to the settling or giving away of the floor; hence when such event occurs, the trap is depressed or bent out of its normal position and the joints at both its ends are broken or rendered imperfect. It will be noticed, therefore, that the present mode of setting up water-closets and traps is such that unless great care is observed the joints between said parts are liable to become imperfect, thereby affording free escape of sewer-gas therefrom, and this, too, in spite of the fact that the closet-bowl is provided with an effective water or valve seal. My invention avoids all such disadvantages, and has for its object to provide a simple, inexpensive, easily-constructed, and durable joint between said parts, which are so connected together that the settling of the floor is prevented; or, in other words, the water-closet and trap are so secured together that they not only support each other, but they also serve as a support for the floor and prevent it sinking or settling.

My invention accordingly consists of the novel combination, construction, and arrangement of parts, as hereinafter set forth.

Referring to the accompanying drawings, A represents the lower end of a hopper or retainer of a water-closet having a flange, $a$, and a lip, $a'$, adapted to enter the bell-mouth end $b$ of trap B. The end $b$ of said trap is also provided with a flange, $b'$, and both it and the flange $a$ are formed with corresponding segmental slots $b^2$ and $a^2$, respectively, as more plainly shown in Fig. 2. The flange $b^2$ has openings $b^3$ $b^3$ for the passage of screws $b^4$ $b^4$, for securing said flange to the floor C. Before fastening said flange to the floor screws $c$ $c$ are inserted in the slots $b^2$ $b^2$ of said flange, so that when the hopper A is placed in position the ends of screws $c$ $c$ will enter and pass through the slots $a^2$ in flange $a$, whereupon said hopper is secured in position by turning or adjusting the nuts $c'$ $c'$ on said screws. In such construction the trap is screwed to the floor and the hopper to the trap, and the breaking of the joint between said parts is avoided. Such joint is composed of a mixture of asphaltum and paraffine-wax; or coal-tar or other suitable or desirable material may be substituted for the wax. Such mixture, when melted, is poured into the annular space B', through opening $a^3$ in flange $a$, until said space and opening are completely filled. The asphaltum mixture does not shrink as it hardens; consequently it makes a perfectly tight joint, which is waterproof and extremely durable.

The slots $a^2$ $b^2$ are made segmental or elongated in outline, for convenience of fitting the hopper to the trap, their use dispensing with the necessity of drilling registering-holes in the flanges $a$ $b'$; but, if desired, the drilled holes may be employed in place of the slots. So, too, if desired, the screws $b^4$ may be dispensed with, and the screws $c$ made long enough to pass through both the flanges $a$ $b'$ and the floor C, as shown at $z$, Fig. 1.

What I claim is—

1. The combination, with a trap, B, having flange $b$, provided with a recess, of a hopper or retainer, A, having flange $a$, with opening $a^3$ above the recess, substantially as described.

2. The combination, with a trap, B, having recessed flange $b'$ and slots or openings $b^2$, of a hopper or retainer, A, having flange $a$ and openings $a^2$ and $a^3$, substantially as shown.

In testimony whereof I affix my signature in presence of two witnesses.

CHARLES F. PIKE.

Witnesses:
S. J. VAN STAVOREN,
CHAS. F. VAN HORN.